Dec. 22, 1959    E. P. LEWANDOSKI    2,918,306
HYDRAULIC VEHICLE SUSPENSION SYSTEM
Filed June 30, 1958
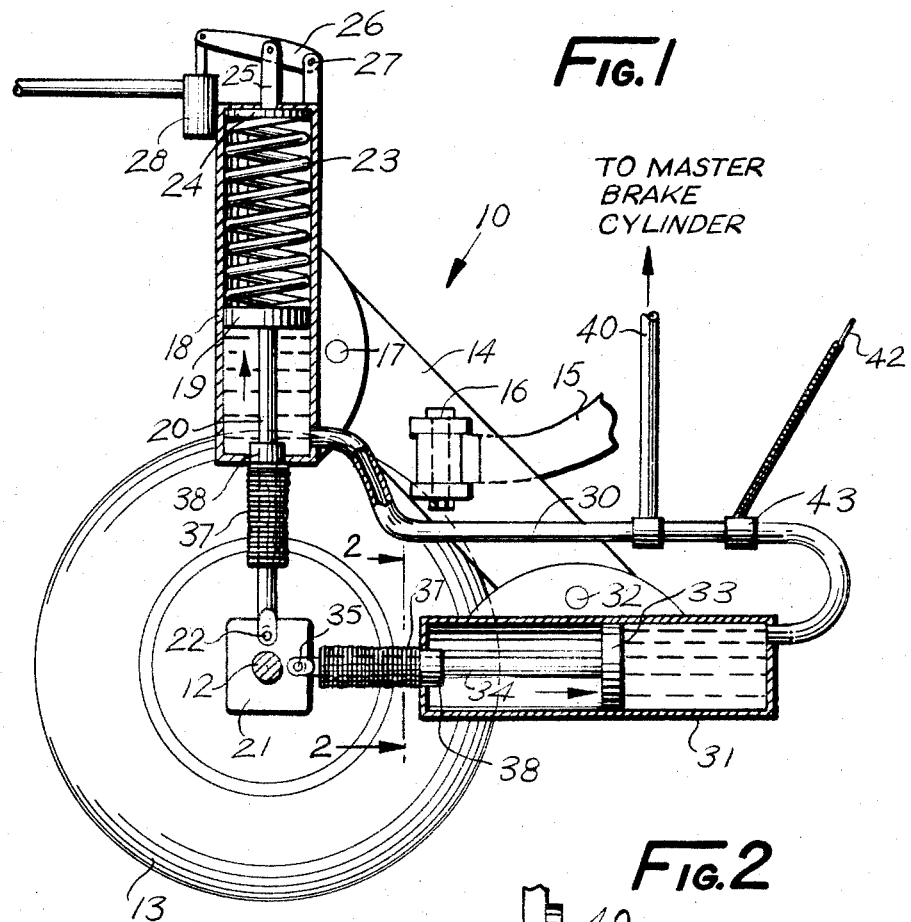
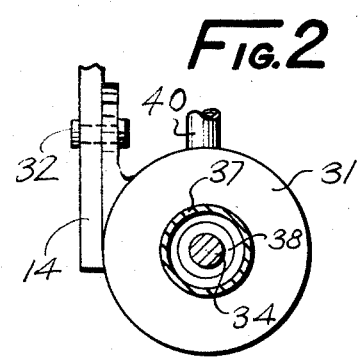
INVENTOR.
Edward P. Lewandoski

United States Patent Office 2,918,306
Patented Dec. 22, 1959

2,918,306

HYDRAULIC VEHICLE SUSPENSION SYSTEM

Edward P. Lewandoski, East Greenwich, R.I.

Application June 30, 1958, Serial No. 745,464

3 Claims. (Cl. 280—124)

This invention relates to automobiles and more particularly to a suspension system therefor.

It is an object of the present invention to provide a hydraulically operated suspension system for supporting a vehicle body upon the wheel and axle units thereof for high speed travel over imperfect roadways.

Another object of the present invention is to provide a power ride suspension system of the above type that is particularly adapted for use with high speed vehicles, such as cars, trucks, and military vehicles, that will effectively prevent large impact forces from being imposed thereon in response to striking a bump or hole in the roadway.

Other objects of the invention are to provide a power ride suspension system bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a side elevational view, with parts broken away, of a power ride suspension system made in accordance with the present invention in operative use with one wheel of an automotive vehicle; and Figure 2 is an enlarged transverse cross sectional view taken along line 2—2 of Figure 1.

Referring now more in detail to the drawing, a power ride suspension system 10 made in accordance with the present invention is shown in operative association with the front axle 12 which rotatably supports a front wheel 13 upon the vehicle. This system includes a mounting plate 14 that is pivotally supported upon the frame 15 of the vehicle by means of a king-pin 16. A first hydraulic cylinder 18 is pivotally supported for adjustable rotation within a vertical plane about a pivot pin 17 and is normally disposed directly above and normal to the axle 12. This cylinder 18 includes a piston 19 that is slidably mounted therein at one end of a downwardly projecting plunger 20 which is connected at its opposite end by means of a pin 22 to the mounting plate 21 of the axle 12. A compression spring 23 acting between the piston 19 and a control plate 24 in the upper end of the cylinder 18 normally supports the weight of the vehicle directly upon the axle 12 through the plunger 20. This control plate 24 has an upwardly extending stem 25 that projects outwardly through the upper end of the cylinder 18 and is pivotally mounted upon the mid section of a lever 26. One end of this lever is pivotally supported by means of a pivot pin 27 upon the upper end of the cylinder 18, while the opposite end thereof is pivotally connected to a level control mechanism 28 that is also associated with the other front wheel of the vehicle, thus providing means for controlling the initial compression of the spring 23 to maintain the front end of the vehicle in a level position at all times. This type of leveling system is well known to those skilled in the art and is not explained in any further detail in this regard.

A pressure fluid supply line 30 communicates at one end with the lower end of the first cylinder 18, and is in communication at its opposite end with the interior of a second hydraulic cylinder 31 that is supported in a substantially horizontal position by means of a pin 32 upon the mounting plate 14. This cylinder 31 also includes a piston 33 that is carried at one end of a horizontally reciprocating plunger 34 which is connected at its opposite end by means of a pivot pin 35 to the axle mounting plate 21.

A resilient boot 37 and fluid bearing seal 38 are associated with each piston and cylinder assembly so as to effectively maintain the pressure fluid within the cylinders and to prevent the entry of dust and other foreign matter therein that might cause undue wear and improper functioning of the parts. A hydraulic connecting line 40 is connected to the supply line 30 intermediate its ends and to the master cylinder of the brake system of the vehicle, for purposes hereinafter described. Similarly, the valve 43 in the line 30 is controllable by means of a control cable 42 that extends to the dashboard of the vehicle.

In actual use, the wheel 13 in response to striking a bump, will automatically be raised vertically by the pressure of fluid passing into the vertical cylinder 18 through the line 30 from the horizontal cylinder 31, which pressure is caused by the rearward movement of the second piston 33 in response to the striking engagement along a horizontal line of the wheel with the bump. This lifting of the wheel 13 thus cushions the impact which would otherwise be much greater without this lifting action which raises the wheel in a direction away from the bump. In the event that the wheel 13 encounters a hole in the roadway, the fluid within the vertical cylinder 18 is forced outwardly into the horizontal cylinder 31 because of the dropping action of the piston 19, which transfer of fluid has the effect of quickly forcing the second piston 33 forwardly so as to move the wheel 13 forwardly relative to the vehicle, so as to carry the wheel over the hole without actually dropping into it. On the other hand, if the hole is of substantial length, the wheel 13 will be permitted to move downwardly into contact with the bottom thereof, which movement is cushioned both by the spring and the hydraulic fluid.

Because of the connecting line 40 leading to the master brake cylinder and the fluid pressure line 30, it is possible to prevent the dropping of the front end of the vehicle in response to a pressure upon the brake pedal that ordinarily occurs. When the brake pedal is depressed, additional fluid is withdrawn from the line 30, thus decreasing the quantity of fluid within the vertical cylinder 18 so as to enable the spring 23 to act additionally upwardly upon the chassis of the vehicle so as to reduce the lowering effect thereof that ordinarily occurs. When the foot is removed from the brake pedal, the hydraulic fluid will return to the line 30. The manually operated control cable 42 has the effect of controlling the passage of fluid between the vertical and horizontal cylinders to either increase or decrease the stabilizing effects described under the control of the operator within the vehicle. Opening the valve will enable the fluid to pass back and forth between the vertical and horizontal cylinders through the line 30, while the closing thereof will effectively block such transfer of fluid and thus substantially lock the piston and cylinder elements in a fixed position with respect to each other.

While various changes may be made in the detail construction, it shall be understood that such changes shall be within the spirit and scope of the present invention as defined by the appended claims.

What I claim as new and desire to protect by Letters Patent of the United States is:

1. A power ride suspension system for automotive vehicles comprising, in combination, a wheel and axle assembly, mounting means for supporting said wheel and axle assembly upon the frame of the vehicle, said mounting means comprising hydraulic means acting in a vertical direction normal to said axle and limiting upward and downward movement of said wheel, second hydraulic means acting in a horizontal direction normal to said axle and limiting rearward and forward movement of said wheel in a horizontal direction, a pressure fluid supply line communicating at opposite ends with said first and second hydraulic means, said mounting means comprising a plate pivotally supported intermediate its ends upon said vehicle frame, and said plate lying in a vertical plane, defining an acute angle with a horizontal plane, said first hydraulic means comprising a cylinder pivotally supported intermediate its ends upon one end of said mounting plate and a plunger having a piston at one end supported within said cylinder and connected at its opposite end to said axle.

2. The combination according to claim 1, wherein said second hydraulic means comprises a cylinder pivotally supported intermediate its ends upon the opposite end of said mounting plate, and a plunger having a piston at one end slidably supported within said cylinder and connected at its opposite end to said axle.

3. The combination according to claim 2, comprising a compression spring acting between said piston of said first hydraulic means and one upper end of said cylinder associated therewith.

References Cited in the file of this patent
UNITED STATES PATENTS 993,849     Lister _____ May 30, 1911